US006848111B1

(12) United States Patent
Schwabe et al.

(10) Patent No.: US 6,848,111 B1
(45) Date of Patent: Jan. 25, 2005

(54) ZERO OVERHEAD EXCEPTION HANDLING

(75) Inventors: Judith E. Schwabe, San Mateo, CA (US); Joshua B. Susser, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/243,107

(22) Filed: Feb. 2, 1999

(51) Int. Cl.$^7$ ............................................. G06F 9/00
(52) U.S. Cl. ..................................... 719/331; 719/332
(58) Field of Search ................................ 707/318, 313, 707/315, 316

(56) References Cited

U.S. PATENT DOCUMENTS

| | | | | |
|---|---|---|---|---|
| 5,367,685 A | | 11/1994 | Gosling | 395/700 |
| 5,628,016 A | * | 5/1997 | Kukol | 717/114 |
| 5,668,999 A | * | 9/1997 | Gosling | 717/126 |
| 5,732,263 A | | 3/1998 | Havens et al. | 395/614 |
| 5,761,513 A | * | 6/1998 | Yellin et al. | 717/127 |
| 5,802,519 A | * | 9/1998 | De Jong | 235/382 |
| 6,009,517 A | * | 12/1999 | Bak et al. | 712/245 |
| 6,092,147 A | * | 7/2000 | Levy et al. | 711/6 |
| 6,308,317 B1 | | 10/2001 | Wilkinson et al. | |
| 6,349,344 B1 | | 2/2002 | Sauntry et al. | |

FOREIGN PATENT DOCUMENTS

EP 0810522 A2 12/1997

OTHER PUBLICATIONS

Ritchey, Tim, "Advanced Topics: The Java Virtual Machine", *Java!*, Chapter 14, pp. 25–346, Sep. 22, 1995.
*Sun Microsystems*, "Java Card 2.0 Language Subset and Virtual Machine Specification", Revision 1.0 Final, Oct. 13, 1997.

*Sun Microsystems*, "Java Card 2.0 Programming Concepts", Revision 1.0 Final, Oct. 15, 1997.

"Sun Delivers On Vision to Bring JAVA Technology to the Consumer and Embedded Market", Business Wire, Sep. 28, 1999.

Sun Microsystems Announces JAVACARD API, Business Wire, Oct. 1996.

Sun Microsystems: "Sun's JAVA Technology Leads Open Worldwide Market for Smart Cards", M2, Presswire, May 1999.

Hof et al., Zero–Overhead Exception Handling Using Metaprogramming, 1997, SOFSEM 97: Theory and Practice of Informatics. 24$^{th}$ Seminar on Current Trends in Theory and Practice of Informatics.

Lindholm & Yellin: The Java Virtual Machine Specification, Oct. 3, 1996.

* cited by examiner

*Primary Examiner*—Meng-Al T. An
*Assistant Examiner*—The Thanh Ho
(74) *Attorney, Agent, or Firm*—Gunnison, McKay & Hodgson, L.L.P.

(57) ABSTRACT

Apparatus and processes, including computer implemented processes, for managing exceptions throwable during execution of methods in one or more classes by a machine. Each method includes an exception handler array defining exception handlers associated with the method. The method includes combining the exception handler arrays for all methods into a single exception handler table.

70 Claims, 8 Drawing Sheets

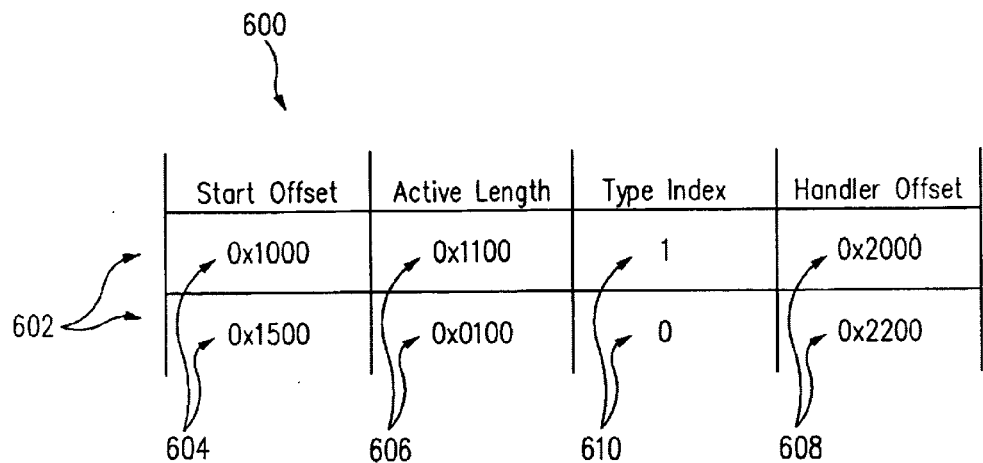
FIG. 6
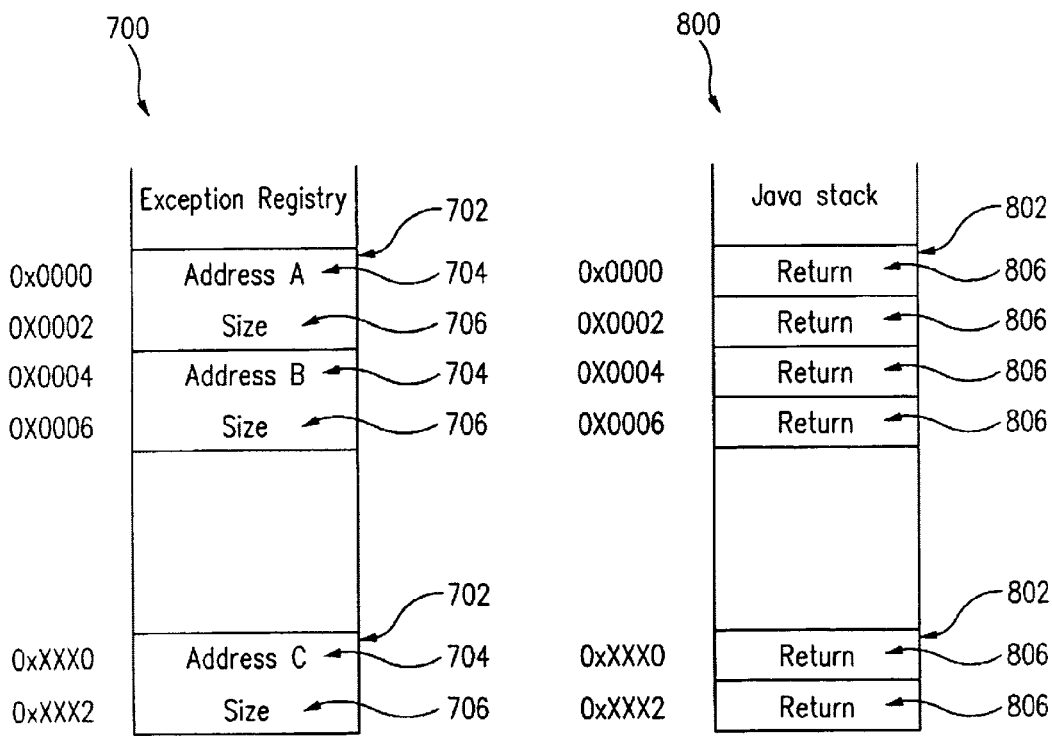
FIG. 7
FIG. 8

ZERO OVERHEAD EXCEPTION HANDLING

CROSS REFERENCE TO RELATED APPLICATIONS

This application is related to the following:

U.S. patent application Ser. No. 09/243,101, filed Feb. 2, 1999, in the names of inventors Judith E. Schwabe and Joshua Susser, entitled "Object-Oriented Instruction Set for Resource-Constrained Devices", commonly assigned herewith;

U.S. patent application Ser. No. 09/243,108, filed Feb. 2, 1999, in the names of inventors Judith E. Schwabe and Joshua Susser, entitled "Token-Based Linking", commonly assigned herewith; and U.S. patent Ser. No. 10/664,216, entitled "Virtual Machine with Securely Distributed Bytecode Verification" by inventors Moshe Levy and Judy Schwabe filed on Sep. 16, 2003, which is a continuation of U.S. patent Ser. No. 10/283,305, now U.S. Pat. No. 6,640,279, entitled "Virtual Machine with Securely Distributed Bytecode Verification" by inventors Moshe Levy and Judy Schwabe, filed on Oct. 30, 2002, which is a continuation of U.S. patent Ser. No. 09/547,225, now U.S. Pat. No. 6,546,454, entitled "Virtual Machine with Securely Distributed Bytecode Verification" by inventors Moshe Levy and Judy Schwabe, filed on Apr. 11, 2000, which is a continuation of patent application Ser. No. 08/839,624, now U.S. Pat. No. 6,092,147, filed Apr. 15, 1997 entitled "Virtual Machine with Securely Distributed Bytecode Verification" by inventors Moshe Levy and Judy Schwabe, commonly assigned herewith.

A portion of the disclosure of this patent document contains material which is subject to copyright protection. The copyright owner has no objection to the facsimile reproduction by anyone of the patent disclosure as it appears in the Patent and Trademark Office patent files or records, but otherwise reserves all copyright rights whatsoever.

BACKGROUND

The present invention relates generally to object oriented computer software, and more specifically to data structures and runtime methods for minimizing stack storage requirements while supporting exception handling in a Java™ virtual machine implemented in resource-constrained devices such as smart cards and the like.

A virtual machine is an abstract computing machine generated by a software application or sequence of instructions which is executed by a processor. Programs executed on a virtual machine can be architecture-neutral. The term "architecture-neutral" refers to programs, such as those written in the Java™ programming language, which can be executed by a virtual machine on a variety of computer platforms having a variety of different computer architectures. Thus, for example, a virtual machine implemented on a Windows™-based personal computer system will use the same set of instructions as a virtual machine implemented on a UNIX™-based computer system. The result of the platform-independent coding of a virtual machine's sequence of instructions is a stream of one or more bytecodes, each of which is, for example, a one-byte long numerical code.

The Java programming language is an object-oriented programming language. In an object-oriented system, a "class" describes a collection of data and methods that operate on that data. Taken together, the data and methods describe the state of and behavior of an object.

The Java programming language also is verifiable, which means that, prior to execution of an application written in the Java programming language, a determination can be made as to whether any instruction sequence in the program will attempt to process data of an improper type for that bytecode or whether execution of bytecode instructions in the program will cause underflow or overflow of an operand stack.

A Java virtual machine executes virtual machine code written in the Java programming language and satisfies "The Java™ Virtual Machine Specification", cited below. A Java virtual machine is designed for use with a 32-bit architecture. However, various resource-constrained devices, such as smart cards, have an 8-bit or 16-bit architecture.

Smart cards, also known as intelligent portable data-carrying cards, generally are made of plastic or metal and have an electronic chip that includes an embedded microprocessor to execute programs and memory to store programs and data. Such devices, which can be about the size of a credit card, typically have limited memory capacity. The limited architecture and memory make it impractical or impossible to implement a Java virtual machine on the device. For example, some smart cards have less than 1K of random access memory (RAM) and 16K of read only memory (ROM). An example of a difficulty when implementing a Java virtual machine on a resource-constrained device arises in the handling of exceptions Referring to FIG. 1, in the context of computer programs written in the Java programming language, an exception handler 100 is a procedure (or a set of instructions within a procedure) that protects a specified set of program code, called a protected code block 102. When a Java program violates the semantic constraints of the Java programming language, the Java virtual machine signals this error to the program as an exception. The exception handler is executed whenever the applicable exception is "thrown" during execution of the corresponding protected code. The Java programming language specification states that an exception will be thrown when semantic constraints are violated and will cause a non-local transfer of control from the point where the exception occurred to a point that can be specified by the programmer. An exception is said to be thrown from the point where it occurred and is said to be caught at the point to which control is transferred. For instance, a particular exception handler, such as a procedure for handling "end-of-file" I/O errors, may be defined to be applicable to a particular portion of a first method 104. If the corresponding exception (i.e., an end-of-file exception in this example) results during execution of the protected code 102, execution of the exception handler 100 is initiated. Exceptions may be thrown implicitly or explicitly. Implicit exceptions are thrown by a Java virtual machine as a result of the execution of a program instruction, such as a null-pointer exception. Alternatively, an explicit exception is included within the body of a method using a Java "throw" statement.

A thrown exception is said to be caught by an exception handler if there is an applicable enclosing exception handler for the thrown exception. An enclosing exception handler is one whose scope or range of applicable instructions includes the instruction that throws a corresponding exception. From the perspective of a particular instruction in a method, the set of enclosing exception handlers is the set of exception handlers whose range of applicable instructions (set of protected code), includes the particular instruction.

The Java programming language often refers to "try statements", "try blocks", "catch clauses" and "finally clauses" when referencing exception handlers. A try statement includes a try block, zero or more catch clauses and an optional finally clause. Exceptions are caught by enclosing code in try blocks. A try block is a portion of code to which a particular exception handler applies (i.e., the protected code block). A catch clause defines an exception handler. A finally clause of a try statement provides a mechanism for executing a section of code whether or not an exception is thrown. In a Java program, a statement or expression is dynamically enclosed by a catch clause if it appears within the try block of the try statement of which the catch clause is a part, or if the caller of the statement or expression is dynamically enclosed by the catch clause.

Whether a particular catch clause handles an exception is determined by comparing the class of the exception object that was thrown to the declared type of the parameter of the catch clause. The catch clause handles the exception if the type of its parameter is the class of the exception or a superclass of the class of the exception. Equivalently, a catch clause will catch any exception object that is an instance of the declared parameter type.

If the protected portion of the first method includes calls (called "invoke" instructions in The Java Virtual Machine Specification, referenced below) to other methods 106, which in turn may include nested calls to a set of further methods 108, 110, then end-of-file errors generated by any of the methods 106, 108, 110 called directly or indirectly by the protected code 102 also will cause execution of exception handler 100 to be invoked. However, nested method 112, can include its own end-of-file exception handler 114. If an exception is thrown when executing method 112, then exception handler 114 will be used to handle end-of-file exceptions caused by execution of instructions included in that particular nested method, as well as end-of-file exceptions caused by execution of any methods 116 called by nested method 112.

In conventional Java programs, all the methods associated with an object class are stored together in a data structure called a class file, which is defined in The Java Virtual Machine Specification. Each method has its own exception table and furthermore the code of each method includes the code for the exception handlers referenced by its exception table. When a Java class file is created, all the exceptions associated with a method are arranged in a list, referred to as an exception handler table. Referring to FIG. 2, a conventional exception handler table 200 includes one or more catch clauses (exception handlers) 202. Each catch clause 202 includes a start pc address 204 and stop pc address 206 that describes the Java virtual machine instruction range for which the exception handler is active, a type indicator 208 that describes the types of exceptions that the catch clause is to handle, and an address 210 at which execution of the exception handler code is to begin.

The order of the catch clauses in the exception handler table is important. The throwing of an exception results in a search by the Java virtual machine through the exception handler table. The Java virtual machine execution continues at a first matching catch clause. Because Java code is structured, it is always possible to arrange all the exception handlers for one method in a single list. For any possible program counter value, this list can be searched to find the proper exception handler, that is, the innermost exception handler that both encloses the program counter (pc) value (where the exception was thrown) and can handle the exception being thrown.

If there is no matching catch clause, the current method is said to have an uncaught exception. When an exception is uncaught, the execution state of the invoker, the method that invoked the current method (if any), is restored. The propagation of the exception continues as though the exception had occurred in the invoker at the instruction that invoked the method actually raising the exception.

Various runtime data structures are maintained by a Java virtual machine to keep track of the execution and invocation of methods. A Java virtual machine can support many threads of execution at once. Each Java virtual machine thread has its own pc (program counter) register. The pc register contains the address of the Java virtual machine instruction currently being executed. Each Java virtual machine thread has a private Java stack, created at the same time as the thread. The Java stack stores Java virtual machine frames. The Java stack is equivalent to the stack of a conventional language such as C: it holds local variables and partial results, and supports method invocation and return.

Referring now to FIG. 3, a conventional Java stack 300 including a plurality of Java virtual machine frames 302 is shown. Each frame 302 includes a reference 304 to a method and a return pointer 306. Reference 304 is a reference to the method that is currently executing, referred to as the current method. Reference 304 is used to indicate which exception handler table to search when an exception is thrown during the execution of the current method. Reference 304 may be of the form of an address at which the current method is stored. The code for each method typically includes the maximum stack space needed by the method, the maximum number of registers used by the method, the actual bytecodes for executing the method and a table of exception handlers.

Reference 304 can point to the beginning of the current method where the exception handler table is typically stored.

Return pointer 306 is a pointer to the method that invoked the current method, and more specifically to the location where execution is to resume in the invoking method at the completion of execution of the current method.

As described above, smart cards and other resource-constrained devices typically include limited memory capacity. Accordingly, programs including a plurality of nested methods that require plural bytes to be stored on the Java stack may cause a stack overflow condition at runtime. It is desirable to limit the information required to be stored in memory at runtime while allowing full support for conventional exception handling in a Java virtual machine.

SUMMARY OF THE INVENTION

In one aspect, the invention provides a computer implemented process for managing exceptions throwable during execution of methods in one or more classes by a machine. Each method includes an exception handler array defining exception handlers associated with the method. The method includes combining the exception handler arrays for all methods into a single exception handler table.

Aspects of the invention include one or more of the following features. All exception handler arrays for all methods in a class or all methods in all classes can be stored in the single exception handler table. All exception handler arrays for all methods in a Java package can be combined in the single exception handler table. A method can be included in a class file. The step of combining all exception handler arrays can include combining the exception handlers of all methods in a class file in the single exception handler table.

The process can include searching the exception handler table when an exception is thrown while executing one of the methods, including locating a first matching exception in the single exception handler table. The searching step can include retrieving in order exception handler entries from the exception handler table, checking the type and range of each exception handler for the first matching exception handler and stopping searching if a current exception handler does not match and is the last handler for the top most level of protected code in an associated method.

All methods in a class are described in a single class file. The class files can be Java class files. The methods in one or more classes can be grouped in a package where the package includes a package data structure including first and second portions. The process can include storing the exception handler table in the first portion of the package and all methods in the second portion of the package. The step of combining can include concatenating the exception handler arrays including loading each exception handler array into the first portion of the package data structure in accordance with a predefined ordering. The predefined ordering can be determined based on the ordering of methods stored in the second portion of the package data structure.

The machine can be a virtual machine implemented on a resource-constrained device. The resource-constrained device can be a smart card. The methods in one or more classes can be grouped in a package and the package can be installed on the smart card. The process can include creating a package where the package includes a package data structure including first and second portions. The process can include concatenating the exception handler arrays for each of the class files into a exception handler table, storing the exception handler table in the first portion of the package and all methods in the second portion of the package.

In another aspect, the invention provides a method minimizing the amount of storage required for a runtime stack when executing a program. The runtime stack is maintained at runtime during the execution of the program by a machine for storing one or more frames where each frame includes a return pointer to an invoking method that called a currently executing method in the program. The method includes combining exception handler information for methods included in the program into a combined exception handler table and locating and searching the combined exception handler table when an exception is thrown during execution of one of the methods to locate the exception handler information without requiring the storage on the runtime stack of a pointer to the exception handler information.

Aspects of the invention can include one or more features. The program can be a Java program. The machine can be a virtual machine implementing a Java virtual machine. The program can include a package of methods where the methods are in one or more classes. The virtual machine can be implemented in a resource constrained device on which the package is installed and executing.

The method can include registering the package in a registry service at installation. The registry service maintains a pointer and a range. The pointer indicates a location in the resource constrained device of the combined exception handler table associated with a given package. The range defines a range of addresses in the resource constrained device at which methods associated with the package are located.

The step of locating can include locating a package associated with a currently executing method including comparing an address at which an exception was thrown against the range for each package registered in the registry service. The searching step can include searching the combined exception handler table associated with a located package.

In another aspect, the invention provides a method of converting class files into a converted applet for execution on a resource constrained device and includes receiving one or more class files where each class file includes one or more methods. Each method includes an exception handler array defining exception handlers throwable by the method. The method includes defining a data structure for storing the methods and exception handlers for the converted applet including a first and second portion and defining an ordering for the methods and loading the methods according to the ordering in the second portion of the data structure. The exception handler arrays for all methods are combined in a single exception handler table. The exception handler arrays are ordered in the table according to the ordering defined for the methods. The method includes storing the single exception handler array in the first portion of the data structure.

In another aspect, the invention provides a computer implemented process for managing exceptions throwable during execution of methods in one or more classes by a virtual machine. Each method includes an exception handler array defining exception handlers associated with the method. The individual exception handler arrays are combined and form a single exception handler table for two or more methods. The process includes searching the exception handler table when an exception is thrown while executing one of the methods including locating a first matching exception in the single exception handler table.

In another aspect, the invention provides a computer system including instructions for causing the computer system to combine the exception handler arrays for methods into a single exception handler table.

In another aspect, the invention provides a computer system including instructions for causing the computer system to combine the exception handler information for methods in a program into a combined exception handler table and locate and search the combined exception handler table when an exception is thrown during execution of one of the methods to locate the exception handler information without requiring the storage on the runtime stack of a pointer to the exception handler information.

In another aspect, the invention provides a computer system including instruction for causing the computer system to receive one or more class files. Each class file includes one or more methods and each method includes an exception handler array defining exception handlers throwable by the method. Instructions are included for causing the computer system to define a data structure for storing the methods and exception handlers for the converted applet including a first and second portion, define an ordering for the methods and load the methods according to the ordering in the second portion of the data structure, combine the exception handler arrays for two or more methods in a single exception handler table including ordering the exception handler arrays according to the ordering defined for the methods and storing the single exception handler array in the first portion of the data structure.

In another aspect, the invention provides a computer system including instructions for causing the computer system to search an exception handler table when an exception is thrown while executing a method. Instructions are included to locate a first matching exception in the single exception handler table.

Embodiments of the invention may include one or more advantages. The amount of information required to be stored on a runtime stack may be minimized while still supporting conventional exception handling procedures. A concatenated exception handler table can be generated that includes entries for all exceptions associated with a package of methods for use in a resource-constrained device. No stack overhead is required to support exception handling. Once an exception is thrown, the Java virtual machine can efficiently search the concatenated exception handler table for the correct exception handler. With an optimization, the searching of the concatenated exception handler table can be efficiently implemented without requiring the evaluation of all of the entries in the concatenated table for certain classes of nested catch clauses. The table entries can be ordered to ensure a match searching termination at a top level handler.

Other features and advantages will be readily apparent from the following detailed description, the accompanying drawings and the claims.

BRIEF DESCRIPTION OF THE DRAWINGS

FIG. 6 is a schematic block diagram of a concatenated exception handler table for a Java package.

FIG. 7 is a schematic block diagram of an exception registry maintained by a Java Card virtual machine.

FIG. 8 shows a runtime stack runtime data area maintained by a Java Card virtual machine.

FIG. 10b is a detailed flow of an implementation for the optimized runtime method described in FIG. 10a.

DESCRIPTION

A data structure and method for processing exceptions thrown during execution of a Java package on a resource-constrained device is described below. Resource-constrained devices are generally considered to be those that are restricted in memory and/or computing power or speed. Although the particular implementation discussed below is described in reference to a smart card, the invention can be used with other resource-constrained devices including, but not limited to, cellular telephones, boundary scan devices, field programmable devices, personal data assistants (PDAs) and pagers, as well as other miniature or small footprint devices. Such devices typically have limited memory capacity. For example, some smart cards have less than 1K of random access memory (RAM) as well as limited read only memory (ROM) and/or non-volatile memory, such as electrically erasable programmable read only memory (EEPROM). Similarly, some resource-constrained devices are based on an architecture designed for fewer than 32 bits. For example, some of the resource-constrained devices which can be used with the invention are based on an 8-bit or 16-bit architecture, rather than a 32-bit architecture.

Figure 1:
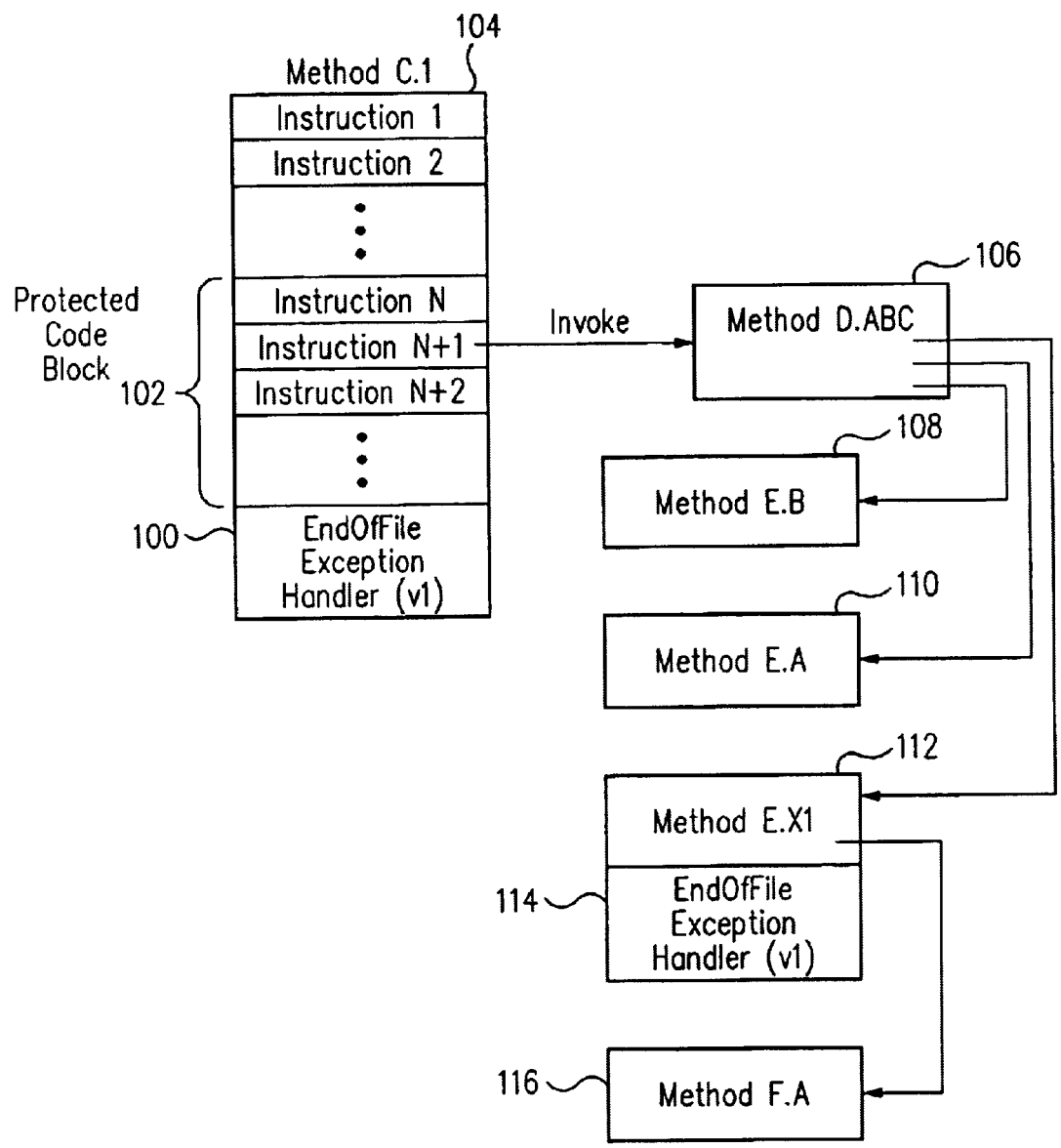
FIG. 1 is a schematic drawing of a set of methods that are linked to each other at runtime by procedure calls.
Figures 2, 3:
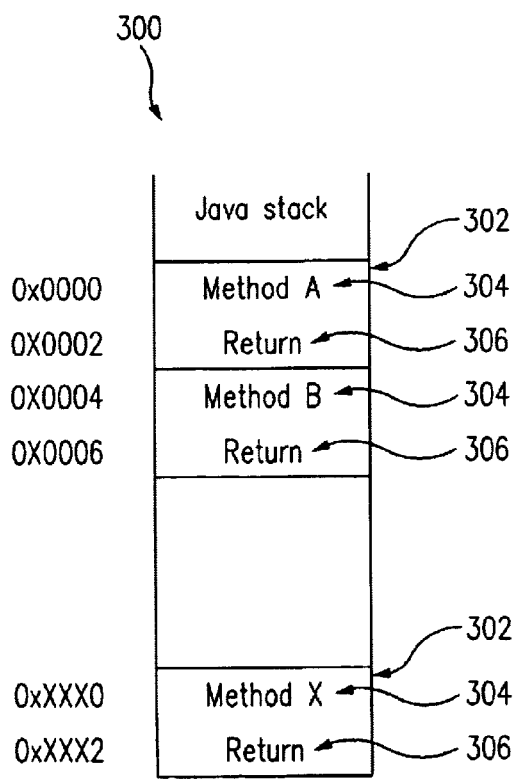
FIG. 2 shows conventional Java exception handler table including entries for each exception enclosed in a method.
FIG. 3 shows a conventional Java stack runtime data area.
Figure 4:
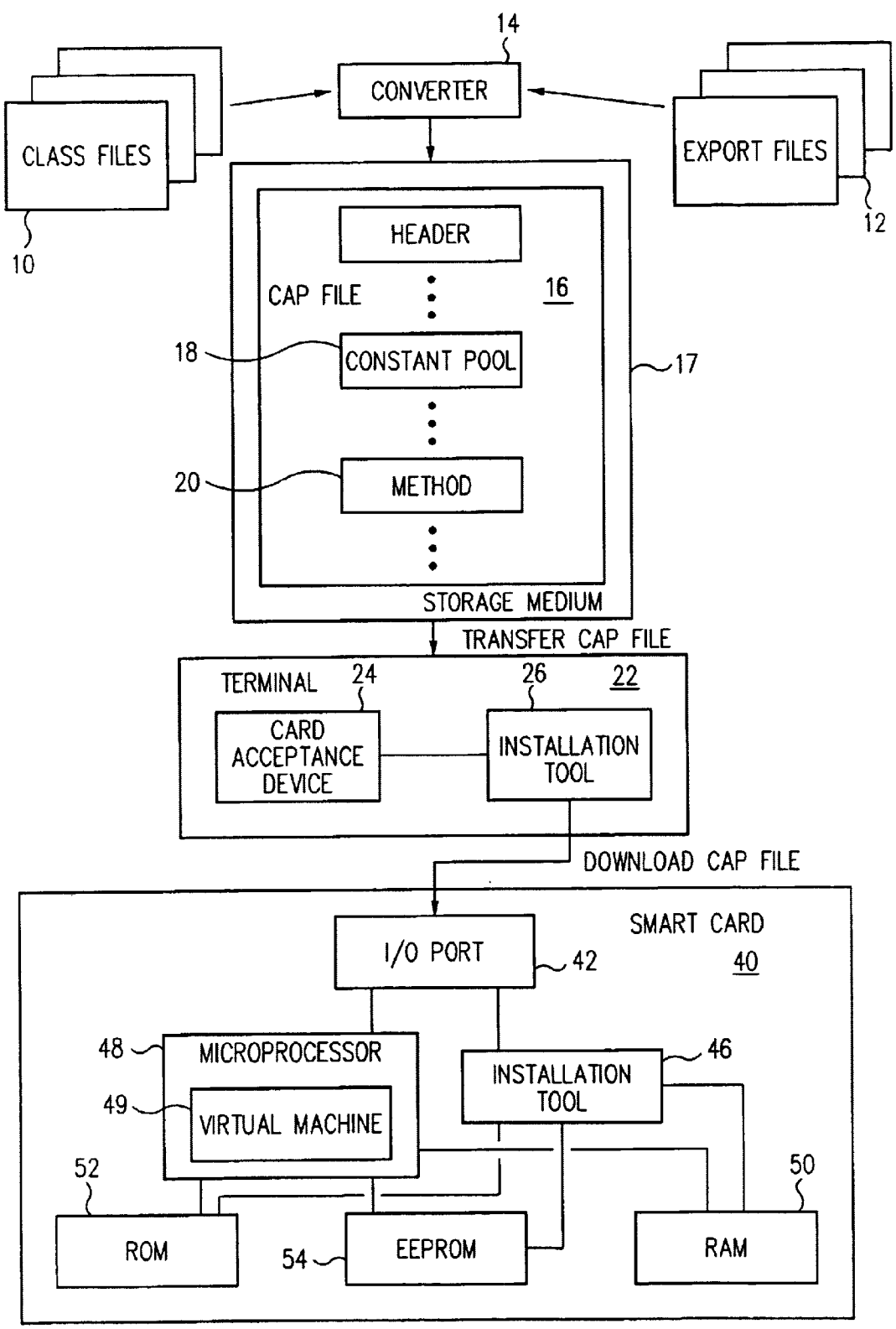
FIG. 4 is a schematic block diagram illustrating an exemplary system including a virtual machine residing on a smart card according to the invention.

Referring to FIG. 4, development of an applet for a resource-constrained device, such as a smart card 40, begins in a manner similar to development of a Java program. In other words, a developer writes one or more Java classes and compiles the source code with a Java compiler to produce one or more class files 10. The applet can be run, tested and debugged, for example, on a workstation using simulation tools to emulate the environment on smart card 40. When the applet is ready to be downloaded to smart card 40, the class files 10 are converted to a converted applet (CAP) file 16 by a converter 14. The converter 14 can be implemented as a Java application being executed by a desktop computer. The converter 14 accepts as its input one or more export files 12 in addition to the class files 10 to be converted. An export file 12 contains naming or linking information for the contents of other packages that are imported by the classes being converted.

In general, the CAP file 16 includes all the classes and interfaces defined in a single Java package and is represented by a stream of 8-bit bytes. All 16-bit and 32-bit quantities are constructed by reading in two or four consecutive 8-bit bytes, respectively. Among other things, the CAP file 16 includes a constant pool component 18 which is packaged separately from a method component 20. The constant pool component 18 includes several types of constants, ranging from numerical literals known at compile time to method and field references which are resolved either when the program is downloaded to the smart card 40 or at the time of execution by the smart card. The method component 20 specifies the set of instructions to be downloaded to and subsequently executed by the smart card 40. Further details of the structure of an exemplary CAP file 16 are discussed in co-pending patent Application entitled "AN OBJECT-ORIENTED INSTRUCTION SET FOR USE WITH OTHER RESOURCE-CONSTRAINED DEVICES", by Joshua B. Susser et al., filed concurrently with the present application.

In general, implementations and applets written for a resource-constrained platform such as the smart card 40 follow the standard rules for Java platform packages. The Java virtual machine and the Java programming language are described in T. Lindholm et al., The Java™ Virtual Machine Specification (1997), and K. Arnold et al., The Java™ Programming Language Second Edition, (1998), which are incorporated herein by reference in their entirety. Application card interface (API) classes for the smart card platform are written as Java source files which include package designations, where a package includes a number of compilation units and has a unique name. Package mechanisms are used to identify and control access to classes, fields and methods.

As is described above, converter 14 accepts as its input one or more export files 12 in addition to the class files 10 to be converted and creates a CAP file 16. Each class file includes an exception handler table associated with each method for a given class. Converter 14 concatenates all the exception handler tables for all the methods of all the classes associated with a package into a single exception handler table. The concatenated exception handler table is maintained with the underlying methods for the package and searched, as will be described in greater detail below, at runtime when an exception is thrown.

Figure 5A:
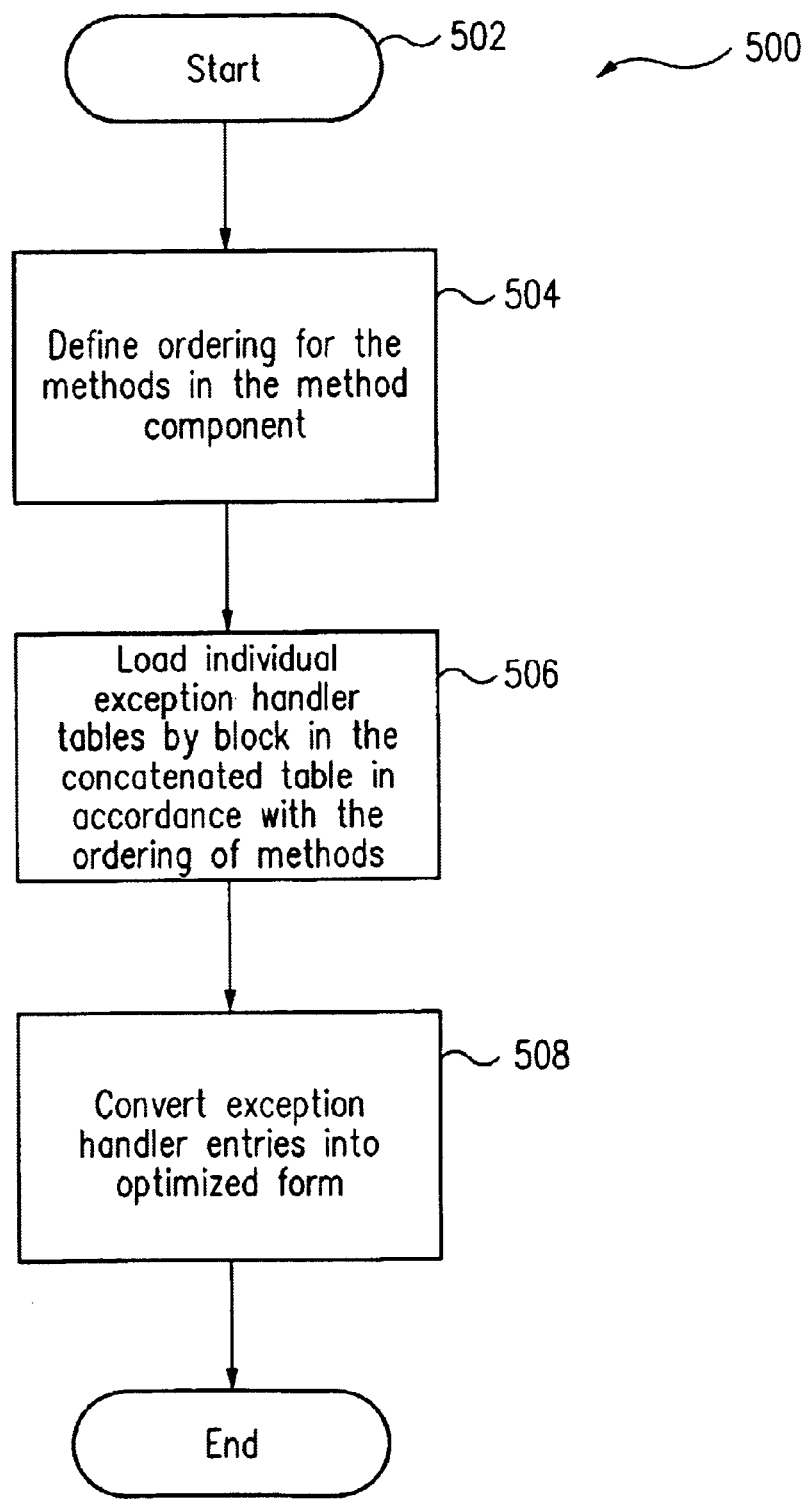
FIG. 5a is a flow diagram for a process of creating a concatenated exception handler table.
Figure 5B:
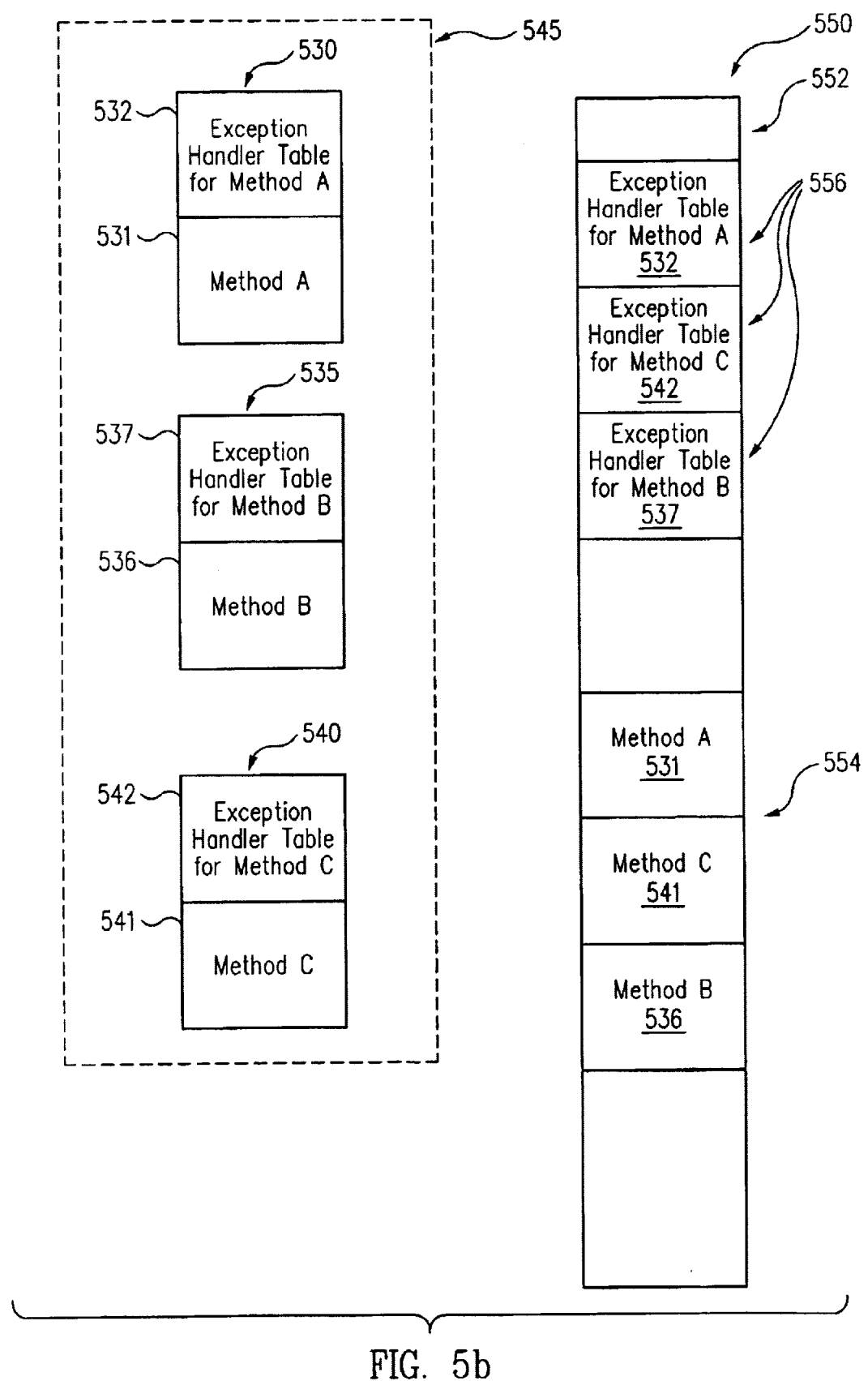
FIG. 5b is a schematic block diagram for a method component data structure including all the methods for a package to be executed on a Java Card™ virtual machine.

Referring now to FIGS. 5a and 5b, a process 500 executed by converter 14 (FIG. 4) for concatenating exception handler tables for all methods in a package begins at step 502. An ordering for the methods in a package is defined (504). The ordering defines the placement of the code for the underlying methods in an associated method component 550. For example, three methods 530, 535 and 540 (Methods A, B and C) are included in a package 545. Each method includes code (531, 536 and 541, respectively) as well as an associated exception handler table (532, 537 and 542, respectively).

The method component describes each of the methods declared in a package. The exception handlers associated with each method are also described. In one implementation, the method component is represented by the following structure:

TABLE 1

```
method_component {
    u1 tag
    u2 size
    u1 handlers_count
    exception_handler_info
    exception_handlers [handlers_count]
    method_info methods []
}
```

The tag item has a value that identifies the data structure as a method component. The size item indicates the number of bytes in the method component structure, excluding the tag and size items. The handlers_count item represents the number of entries in the concatenated exception handler table. The exception_handlers item represents an array of 8-byte exception handler structures arranged in a table, referred to as the concatenated exception handler table. Each exception handler structure represents a catch or finally clause defined in a method of the package. Entries in the concatenated exception handler table are sorted in ascending order by the distance between the beginning of the method component to the endpoint of each active exception handler range in the methods item. The ordering of blocks of exception handlers associated with particular methods in a package is discussed in greater detail below.

The methods item represents an array of variable-length method info structures. Each entry represents a method declared in a class or interface of the given package.

For purposes of the present application, method component 550 may be represented as a data structure that includes two portions, first and second portions 552 and 554. First portion 552 is a place holder for the exception handlers for all the underlying methods of the package. The exception handlers are stored in a concatenated exception handler table 556. The individual method code is stored in second portion 554.

The individual exception handler tables are loaded into the concatenated exception handler table and ordered in accordance with the ordering defined by step 504 (506). That is, each exception handler table for each method is loaded in block form into the concatenated exception handler table 556. The local ordering defined in each individual exception handler table for each method is maintained. In the example shown in FIG. 5b, the methods are ordered A, C and B, in second portion 554 of the method component after the execution of ordering step 504. The associated exception handler tables A, B and C are loaded in concatenated exception handler table 556 in the same order (A, C then B). The ordering of individual exception handlers in the individual exception handler tables satisfies conventional Java programming language constructs to assure a first match by a Java virtual machine at runtime is the most specific match that can arise.

In one implementation, exceptions are organized in a class hierarchy. The exception class hierarchy has a highest exception class called "Throwable" and two main branches: a set of extraordinarily serious exceptions whose superclass is the "Error" class and a set of somewhat less catastrophic exceptions whose superclass is the "Exception" class.

When an exception is thrown, a Java virtual machine executes the first exception handler found in a tree search of the enclosing exception handlers that is applicable to the thrown exception. To ensure that the lowest class enclosing exception handler applicable to the thrown exception is used, the authors of Java programs (i.e., methods) will generally order the exception handlers within each method so that the lower class exception handlers are positioned before the higher class exception handlers (where class rank is determined by position of the exception hierarchy). Further, when there are two or more enclosing exception handlers for exactly the same exception condition that are applicable to an instruction that causes that exception to be thrown, a Java virtual machine executes the applicable enclosing exception handler established by the method closest in the chain of method calls to the method causing the thrown exception.

After the individual exception handler tables are ordered and loaded in step 506, each exception handler entry in concatenated exception handler table 556 is converted to an optimized data structure for use in a resource-constrained device, such as smart card 40 (FIG. 4) (508). In one implementation, the data structure for an optimized entry in concatenated exception handler table 556 is shown in FIG. 6. Concatenated exception handler table 600 includes a plurality of entries 602, each of which includes data in accordance with an exception handler information data structure. The exception handler information data structure includes a start offset 604, active length 606, handler offset 610 and catch type index 612.

Start offset 604 and an end offset (not shown) are byte offsets into the particular method component. The start and end offset indicate the range in a bytecode array at which the exception handler is active. The value of start offset 604 must be a valid offset into a bytecode array to the opcode of an instruction.

The end offset is defined as the sum of start offset 604 plus active length 606. The value of the end offset either must be a valid offset into a code array of the opcode of an instruction or must be equal to a method's bytecode count (the length of the code array). The value of start offset 604 must be less than the value of the end offset. Start offset 604 is inclusive and the end offset is exclusive; that is, the exception handler must be active while the execution address is within the interval [start offset, end offset].

Active length 606 defines in bytecodes the range of instructions enclosed by the given exception handler. In one implementation, active length 606 is encoded to indicate whether the active range of the particular exception handler is nested within another exception handler, and more specifically, whether the current exception handler is the last handler in a list of exception handlers associated with a particular protected code block. For programs written in the Java programming language, the bit is encoded to indicate if the current exception handler is the last handler (catch or finally clause) in a list of exception handlers for a protected code block. The high bit of active length 606 is set to one ("1") if the protected code block is not contained within another protected code block and the current handler is the last handler associated with the protected code block. The bit is set to zero ("0") if the protected code block is contained within another protected code block or the current handler is not the last handler associated with the protected code block. Where the encoding is used, the end offset is defined as the sum of start offset 604 plus active length 606 and 0x7FFF.

Handler offset 608 represents a byte offset into the info item of the method component. More specifically, handler offset 608 indicates the start of the exception handler and a location at which point execution is to resume by the Java virtual machine when the particular exception is caught. The value of handler offset 608 must be a valid offset into a method's bytecode array to an opcode of an instruction, and must be less than the value of the method's bytecode count.

Catch type index 610 indicates the execution handler type. In order to transfer control to the exception handler, the pc associated with the thrown exception must fall within the range defined for the exception handler and be of the same type. If the value of the catch type index 610 is non-zero, it must be a valid index into the constant pool table representing the class of the exception caught by this exception handler. If the exception handler represents a finally clause, the value of catch type index 610 is set to zero. A finally clause exception handler is called for all exceptions that are thrown within the start offset and end offset range, irrespective of type.

Referring again to FIG. 4, after conversion, the CAP file 16 can be stored on a computer-readable medium 17 such as a hard drive, a floppy disk, an optical storage medium, a flash device or some other suitable medium.

The CAP file 16 then can be copied or transferred to a terminal 22 such as a desktop computer with a peripheral card acceptance device (CAD) 24. The CAD 24 allows information to be written to and retrieved from the smart card 40. The CAD 24 includes a card port (not shown) into which the smart card 40 can be inserted. Once inserted, contacts from a connector press against a surface connection area on the smart card 40 to provide power and to permit communications with the smart card 40. The terminal 22 also includes an installation tool or program 26 which loads the CAP file 16 and transmits it to the card 40.

The smart card 40 has an input/output (I/O) port 42 including a set of contacts through which programs, data and other communications can be provided. The smart card 40 also includes an installation tool 46 for receiving the contents of the CAP file 16 and preparing the applet for execution on the card 40. The installation tool 46 can be implemented, for example, as a Java program and can be executed on the smart card 40. The smart card 40 also has memory, including volatile memory such as RAM 50 and non-volatile memory such as electrically erasable programmable read only memory (EEPROM) 54. The smart card 40 also has ROM such as ROM 52. The applet (CAP file 16) prepared by the converter 14 can be stored in EEPRROM 54.

As part of the installation process one or more data areas are created by the installation tool 46 to facilitate runtime operations. One example of a data area is an exception registry. The exception registry is a list used by a Java Card™ virtual machine when interpreting thrown exceptions.

Referring now to FIGS. 4 and 7, exception registry 700 can be a linked list data structure that is extendable. New entries may be added to the head of the list. Each entry 702 in exception registry 700 represents a method component 550 (See FIG. 5b) that contains exception handlers. Method components without exception handlers are not included.

During installation of a CAP file, installation tool 46 calls a Java Card virtual machine to register the method component associated with a package. Each entry includes an address 704 of the associated method component and its size 706. Address 704 and size 706 define a range, with reference to the program counter (pc), for instructions that are included in a package. The use of the exception registry is described in greater detail below.

As described above in the Background, a Java virtual machine maintains various run-time data structures to keep track of the execution and invocation of methods. A Java Card virtual machine does the same. At runtime, a Java Card virtual machine maintains a pc and a runtime stack. A runtime stack stores Java Card virtual machine frames. Referring now to FIG. 8, a runtime stack 800 including a plurality of Java Card virtual machine frames 802 is shown. Each frame 802 includes a return pointer 806.

Return pointer 806 is a pointer to the method that invoked the current method, and more specifically to the location where execution is to resume in the invoking method at the completion of execution of the current method.

As explained further below, no reference to the method that is currently executing needs to be maintained on the runtime stack. All the exception handlers for all methods associated in a package are stored in a single concatenated exception handler table, which can be searched at runtime for an exception handler relevant to the current pc.

Figure 9:
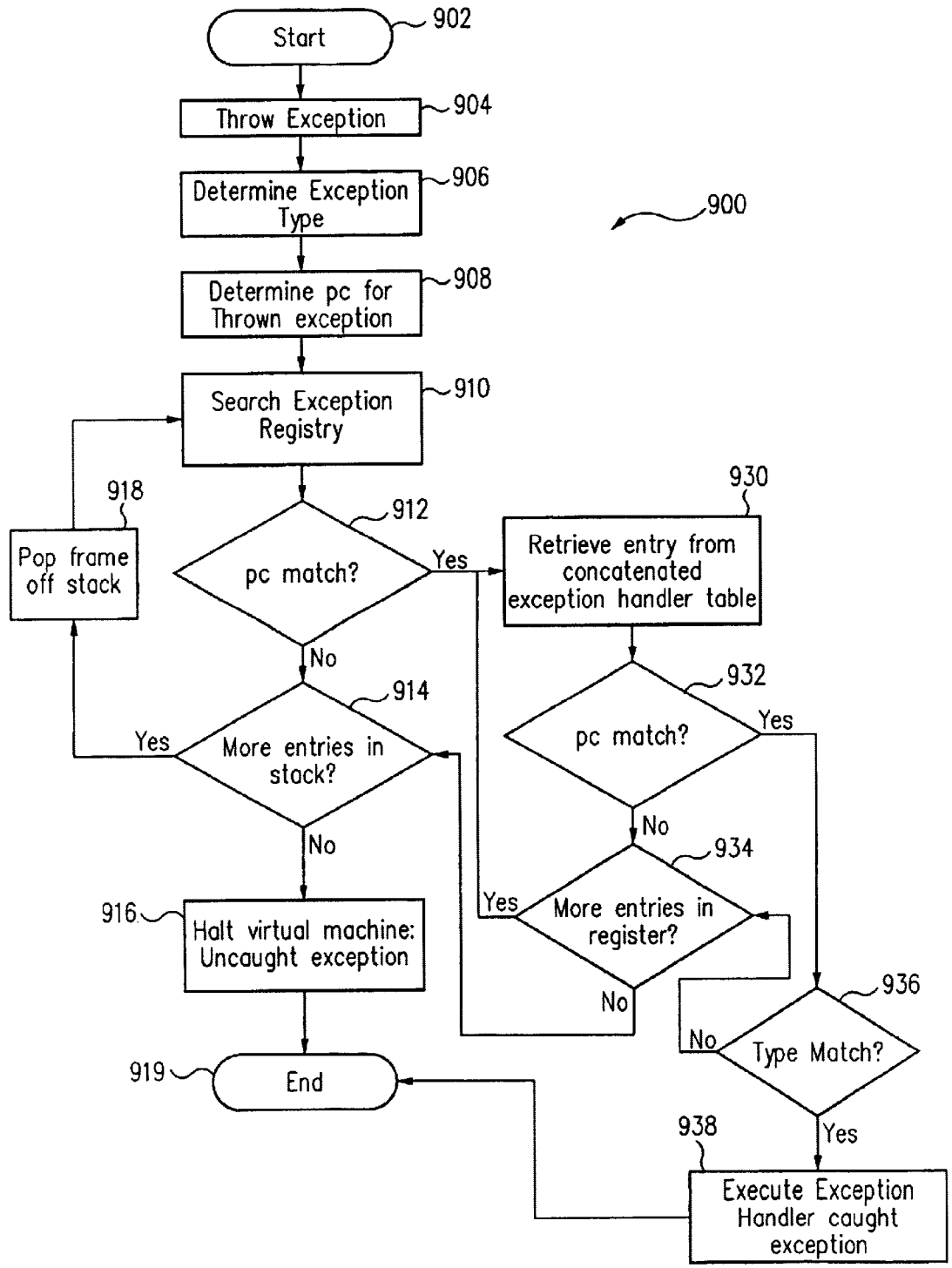
FIG. 9 is a flow diagram for a runtime method for searching a concatenated exception handler table.

Referring now to FIG. 9, a process 900 for runtime exception handling begins at step 902. A Java Card virtual machine either explicitly or implicitly throws an exception (904). The class of the exception is determined (906) along with the pc position where the exception was thrown (908).

A search is performed in the exception registry to locate a method component that encloses the pc where the exception was thrown (910). This determines in which package the method of the current frame is implemented. If no matching enclosing method component is found (and hence, no concatenated exception handler table) (912), then a check is made to determine if a stack frame is available to pop off the runtime stack (914). If no more stack frames are available to pop off the runtime stack, then the Java Card virtual machine is halted with an uncaught exception (916). If another frame is available to be popped off the runtime stack, then the frame is popped (918). The popping of the frame includes reinstating the previous frame and setting the pc to a new value, namely, the return location indicated by the return pointer stored on the runtime stack and associated with the previous frame. Thereafter, the process continues at step 910. The popping of entries off the runtime stack allows for nesting of methods among packages. That is, a method in a first package may be called (invoked) by an invoking method in second distinct package. As such, the invoking method is said to enclose the called method, and accordingly may include an exception handler that is applicable in the event the called method does not catch a given exception.

If an enclosing method component is located in searching step 910, then an entry in the associated concatenated exception handler table (the current concatenated exception handler table) associated with the method component is retrieved (in this case, the first entry) (930). In one implementation, the starting address stored in the exception registry points to the address for the first entry in the concatenated exception handler table for the given method component. As such, the execution of the following steps may proceed directly after the retrieval of the starting address from the exception registry.

The range associated with the current entry being tested is checked to determine if it encloses the pc where the exception was thrown (932). If no match arises, then a next entry in the current concatenated exception handler table is retrieved at step 930. If no more entries are available (934), then the process continues at step 914 checking to determine if more stack frames are available to be popped as described above.

If the range encloses the pc in step 932, then a check is made to determine if the type of exception specified by the exception handler matches the exception thrown (936). The type matches if the type of exception thrown is of the same class as the specified class or a subclass of the specified class. A match also occurs if the exception handler corresponds to a finally clause. A finally clause is a Java programming language construct that allows a programmer to define an exception handler that will be executed for all class types and as such is a match for all types of thrown exceptions. If the type matches, the exception handler associated with the current entry is executed (938) and the process completes (940). More specifically, the pc is set based on the address stored in the current entry for the exception handler (handler offset 610 from FIG. 6) and execution continues with the first statement of the caught exception handler.

Figure 10A:
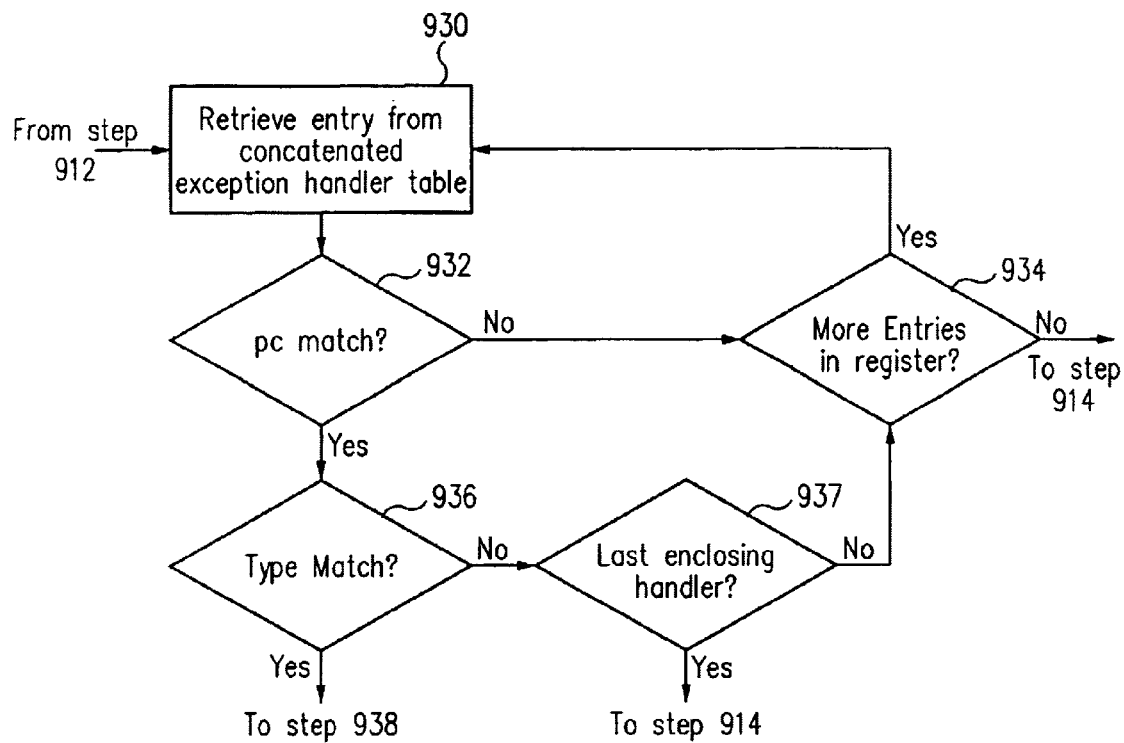
FIG. 10a is a flow diagram for an optimized runtime method for searching a concatenated exception handler table.
Figure 10B:
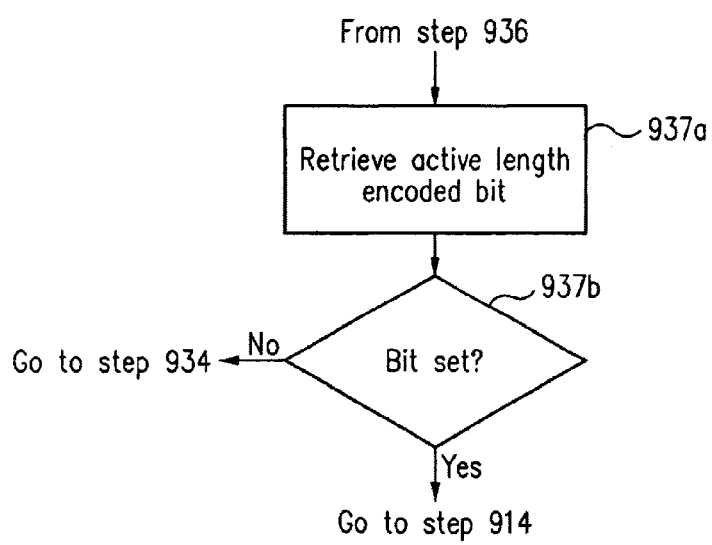

In one implementation, not all of the entries in the concatenated exception handler table are required to be tested prior to a determination that an uncaught exception has been thrown. Referring now to FIG. 10a, after the type test in step 936, an additional test is performed to determine if another enclosing try statement is included in the current method (937). As described above, an enclosing try statement reflects another exception handler whose range also encloses the current pc. If no other enclosing try statement is present, then the process can immediately jump to the runtime stack popping step 914 irrespective of whether other entries in the current concatenated exception handler table remain to be processed.

In one implementation, step 937 can be invoked using the optimization bit (the encoded high bit of the active length 606 item) stored in the concatenated exception handler table for the current entry. More specifically, the high bit of the active length for the current entry is retrieved (937a). A check is made to determine if the bit is set (937b). If the bit is not set (indicating that an enclosing try statement is present or that further handlers for the same try statement are present), then the process continues at step 934. If the bit is set, then the process continues at step 914.

While the present invention has been described with reference to a few specific embodiments, the description is illustrative of the invention and is not to be construed as limiting the invention. Various modifications may occur to those skilled in the art without departing from the scope of the invention as defined by the appended claims.

The present invention is applicable to programs and methods written in programming languages other than Java, including programming languages that are compiled to platform dependent code. The techniques described can be applied in other contexts, for example to programs written in C or Pascal where similar runtime stack manipulations are required.

What is claimed is:

1. A computer implemented process for managing exceptions throwable during execution of methods in one or more classes on a resource-constrained device, each method including protected code and an exception handler array defining exception handlers associated with the method, the process comprising:

defining an ordering for the methods, the ordering defining the placement of the protected code in a first portion of a package; and combining in block form the exception handler arrays for the methods into a single exception handler table, the combining comprising positioning the exception handler arrays in a second portion of the package based on the ordering for the methods.

2. The process of claim 1 including combining all exception handler arrays for all methods in a class in the single exception handler table.

3. The process of claim 1 including combining all exception handler arrays for all methods in all classes in the single exception handler table.

4. The process of claim 1 including combining all exception handler arrays for all methods in a Java package in the single exception handler table.

5. The process of claim 1 where a method is included in a class file and the step of combining all exception handler arrays includes combining the exception handler arrays for all methods in a class file in the single exception handler table.

6. The process of claim 1 further including searching the exception handler table when an exception is thrown while executing one of the methods including locating a first matching exception in the single exception handler table.

7. The process of claim 6 where the searching step includes retrieving in order exception handler entries from the exception handler table and checking the type and range of each exception handler for the first matching exception handler.

8. The process of claim 7 further comprising stopping searching if a current exception handler does not match and is the last handler for the top most level of protected code in an associated method.

9. The process of claim 1 where the class files are Java class files.

10. The process of claim 1 where the resource-constrained device comprises a virtual machine configured to perform said execution of said methods.

11. The process of claim 10 where the resource constrained device is a smart card.

12. The process of claim 11 where the methods in one or more classes are grouped in a package and the package is installed on the smart card.

13. A method minimizing the amount of storage required for a runtime stack when executing a program, the runtime stack maintained at runtime during the execution of the program on a resource-constrained device for storing one or more frames where each frame includes a return pointer to an invoking method that called a currently executing method in the program, the method comprising:

defining an ordering for methods included in the program, each method including protected code and an exception handler array defining exception handlers associated with the method, the ordering defining the placement of the protected code in a first portion of a package;

combining in block form exception handler information for the methods included in the program into a combined exception handler table, the combining comprising positioning the exception handler arrays in a second portion of the package based on the ordering for methods included in the program; and locating and searching the combined exception handler table when an exception is thrown during execution of one of the methods to locate the exception handler information without requiring the storage on the runtime stack of a pointer to the exception handler information.

14. The method of claim 13 where the pointer is a direct pointer to the exception handler information.

15. The method of claim 13 where the program is a Java program.

16. The method of claim 15 where the resource-constrained device comprises a virtual machine implementing a Java™ virtual machine and configured to perform said execution of said methods.

17. The method of claim 16 where the program includes a package of methods, the methods in one or more classes, and where the virtual machine is implemented in a resource constrained device on which the package is installed and executing.

18. The method of claim 17 where the resource constrained device is a smart card.

19. The method of claim 17 further including registering the package in a registry service at installation, the registry service maintaining a pointer and a range, the pointer indicating a location in the resource constrained device of the combined exception handler table associated with a given package, the range defining a range of addresses in the resource constrained device at which methods associated with the package are located.

20. The method of claim 19 where the step of locating includes locating a package associated with a currently executing method including comparing an address at which an exception was thrown against the range for each package registered in the registry service, the searching step including searching the combined exception handler table associated with a located package.

21. A method of converting class files into a converted applet for execution on a resource constrained device, the method comprising:
receiving one or more class files, each class file including one or more methods, each method including protected code and an exception handler array defining exception handlers catchable by the method;
defining a data structure for storing the methods and exception handlers for the converted applet including a first and second portion;
defining an ordering for the methods and loading the methods according to the ordering in the second portion of the data structure; and
combining in block form the exception handler arrays for all methods in a single exception handler table including ordering the exception handler arrays according to the ordering defined for the methods and storing the single exception handler array in the first portion of the data structure.

22. A computer implemented process for managing exceptions throwable during execution of two or more methods in one or more classes by a virtual machine on a resource-constrained device, each method included in a class and including protected code and an exception handler array defining exception handlers associated with the method, the protected code of the two or more methods stored in a first portion of a package according to an ordering, the individual exception handler arrays combined in block form and forming a single exception handler table for the two or more methods, the exception handler arrays positioned in a second portion of the package based on the ordering of the two or more methods, the process comprising:
searching the exception handler table when an exception is thrown while executing one of the methods including locating a first matching exception in the single exception handler table.

23. A computer implemented system for managing exceptions throwable during execution of methods in one or more classes on a resource-constrained device, each method including protected code and an exception handler array defining exception handlers associated with the method, the system comprising instructions to:
define an ordering for the methods, the ordering defining the placement of the protected code in a first portion of a package; and
combine in block form the exception handler arrays for all methods into a single exception handler table, the combining comprising positioning the exception handler arrays in a second portion of the package based on the ordering for the methods.

24. A computer implemented system for minimizing the amount of storage required for a runtime stack when executing a program, the runtime stack maintained at runtime during the execution of the program on a resource-constrained device for storing one or more frames where each frame includes a return pointer to an invoking method that called a currently executing method in the program, the system comprising instructions to:
define an ordering for methods included in the program, each method including protected code and an exception handler array defining exception handlers associated with the method, the ordering defining the placement of the protected code in a first portion of a package;
combine in block form the exception handler information for the methods included in the program into a combined exception handler table, the combining comprising positioning the exception handler arrays in a second portion of the package based on the ordering for methods included in the program; and
locate and search the combined exception handler table when an exception is thrown during execution of one of the methods to locate the exception handler information without requiring the storage on the runtime stack of a pointer to the exception handler information.

25. A computer implemented system for converting class files into a converted applet for execution on a resource constrained device, the system comprising instructions to:
receive one or more class files, each class file including one or more methods, each method including protected code and an exception handler array defining exception handlers catchable by the method;
define a data structure for storing the methods and exception handlers for the converted applet including a first and second portion;
define an ordering for the methods and loading the methods according to the ordering in the second portion of the data structure; and
combine in block form the exception handler arrays for all methods in a single exception handler table including order the exception handler arrays according to the order defined for the methods and store the single exception handler array in the first portion of the data structure.

26. A computer implemented system for managing exceptions throwable during execution of methods in one or more classes by a virtual machine on a resource-constrained device, each method in a class described by a class file and including protected code and an exception handler array defining exception handlers associated with the method, the protected code of the two or more methods stored in a first portion of a package according to an ordering, the individual exception handler arrays combined in block form and forming a single exception handler table for two or more methods, the exception handler arrays positioned in a second portion of the package based on the ordering of the two or more methods, the system comprising instructions to:

search the exception handler table when an exception is thrown while executing one of the two or more methods including locate a first matching exception in the single exception handler table.

27. A program storage device readable by a machine, embodying a program of instructions executable by the machine to perform a process for managing exceptions throwable during execution of methods in one or more classes on a resource-constrained device, each method including protected code and an exception handler array defining exception handlers associated with the method, the process comprising:

defining an ordering for the methods, the ordering defining the placement of the protected code in a first portion of a package; and combining in block form the exception handler arrays for the methods into a single exception handler table, the combining comprising positioning the exception handler arrays in a second portion of the package based on the ordering for the methods.

28. The program storage device of claim 27 where the process includes combining all exception handler arrays for all methods in a class in the single exception handler table.

29. The program storage device of claim 27 where the process includes combining all exception handler arrays for all methods in all classes in the single exception handler table.

30. The program storage device of claim 27 where the process includes combining all exception handler arrays for all methods in a Java™ package in the single exception handler table.

31. The program storage device of claim 27 where a method is included in a class file and the combining all exception handler arrays includes combining the exception handler arrays for all methods in a class file in the single exception handler table.

32. The program storage device of claim 27 where the process further includes searching the exception handler table when an exception is thrown while executing one of the methods including locating a first matching exception in the single exception handler table.

33. The program storage device of claim 32 where the searching includes retrieving in order exception handler entries from the exception handler table and checking the type and range of each exception handler for the first matching exception handler.

34. The program storage device of claim 33 where the process further comprises stopping searching if a current exception handler does not match and is the last handler for the top most level of protected code in an associated method.

35. The program storage device of claim 27 where the class files are Java™ class files.

36. The program storage device of claim 27 where the machine is a virtual machine implemented on a resource constrained device.

37. The program storage device of claim 36 where the resource constrained device is a smart card.

38. The program storage device of claim 37 where the methods in one or more classes are grouped in a package and the package is installed on the smart card.

39. A program storage device readable by a machine, embodying a program of instructions executable by the machine to perform a process for minimizing the amount of storage required for a runtime stack when executing a program, the runtime stack maintained at runtime during the execution of the program on a resource-constrained device for storing one or more frames where each frame includes a return pointer to an invoking method that called a currently executing method in the program, the process comprising:

defining an ordering for methods included in the program, each method including protected code and an exception handler array defining exception handlers associated with the method, the ordering defining the placement of the protected code in a first portion of a package;

combining in block form exception handler information for the methods included in the program into a combined exception handler table, the combining comprising positioning the exception handler arrays in a second portion of the package based on the ordering for methods included in the program; and locating and searching the combined exception handler table when an exception is thrown during execution of one of the methods to locate the exception handler information without requiring the storage on the runtime stack of a pointer to the exception handler information.

40. The program storage device of claim 39 where the pointer is a direct pointer to the exception handler information.

41. The program storage device of claim 39 where the program is a Java™ program.

42. The program storage device of claim 41 where the machine is a virtual machine implementing a Java™ virtual machine.

43. The program storage device of claim 42 where the program includes a package of methods, the methods in one or more classes, and where the virtual machine is implemented in a resource constrained device on which the package is installed and executing.

44. The program storage device of claim 43 where the resource constrained device is a smart card.

45. The program storage device of claim 43 where the process further includes registering the package in a registry service at installation, the registry service maintaining a pointer and a range, the pointer indicating a location in the resource constrained device of the combined exception handler table associated with a given package, the range defining a range of addresses in the resource constrained device at which methods associated with the package are located.

46. The program storage device of claim 45 where the locating includes locating a package associated with a currently executing method including comparing an address at which an exception was thrown against the range for each package registered in the registry service, the searching including searching the combined exception handler table associated with a located package.

47. A program storage device readable by a machine, embodying a program of instructions executable by the machine to perform a process for converting class files into a converted applet for execution on a resource constrained device, the process comprising:

receiving one or more class files, each class file including one or more methods, each method including protected code and an exception handler array defining exception handlers catchable by the method;

defining a data structure for storing the methods and exception handlers for the converted applet including a first and second portion;

defining an ordering for the methods and loading the methods according to the ordering in the second portion of the data structure; and combining in block form the exception handler arrays for all methods in a single exception handler table including ordering the exception handler arrays according to the ordering defined for the methods and storing the single exception handler array in the first portion of the data structure.

48. A program storage device readable on a resource-constrained device, embodying a program of instructions executable by the machine to perform a method for managing exceptions throwable during execution of two or more methods in one or more classes by a virtual machine on a resource-constrained device, each method included in a class and including protected code and an exception handler array defining exception handlers associated with the method, the protected code of the two or more methods stored in a first portion of a package according to an ordering, the individual exception handler arrays combined in block form and forming a single exception handler table for the two or more methods, the exception handler arrays positioned in a second portion of the package based on the ordering of the two or more methods, the process comprising:

searching the exception handler table when an exception is thrown while executing one of the methods including locating a first matching exception in the single exception handler table.

49. An apparatus for managing exceptions throwable during execution of methods in one or more classes on a resource-constrained device, each method including protected code and an exception handler array defining exception handlers associated with the method, the apparatus comprising:

means for defining an ordering for the methods, the ordering defining the placement of the protected code in a first portion of a package; and means for combining in block form the exception handler arrays for the methods into a single exception handler table, the combining comprising positioning the exception handler arrays in a second portion of the package based on the ordering for the methods.

50. The apparatus of claim 49 including means for combining all exception handler arrays for all methods in a class in the single exception handler table.

51. The apparatus of claim 49 including means for combining all exception handler arrays for all methods in all classes in the single exception handler table.

52. The apparatus of claim 49 including means for combining all exception handler arrays for all methods in a Java™ package in the single exception handler table.

53. The apparatus of claim 49 where a method is included in a class file and the means for combining all exception handler arrays includes means for combining the exception handler arrays for all methods in a class file in the single exception handler table.

54. The apparatus of claim 49 further including means for searching the exception handler table when an exception is thrown while executing one of the methods including locating a first matching exception in the single exception handler table.

55. The apparatus of claim 54 where the means for searching includes means for retrieving in order exception handler entries from the exception handler table and means for checking the type and range of each exception handler for the first matching exception handler.

56. The apparatus of claim 55, further comprising means for stopping searching if a current exception handler does not match and is the last handler for the top most level of protected code in an associated method.

57. The apparatus of claim 49 where the class files are Java™ class files.

58. The apparatus of claim 49 where the machine is a virtual machine implemented on a resource constrained device.

59. The apparatus of claim 58 where the resource constrained device is a smart card.

60. The apparatus of claim 59 where the methods in one or more classes are grouped in a package and the package is installed on the smart card.

61. An apparatus for minimizing the amount of storage required for a runtime stack when executing a program, the runtime stack maintained at runtime during the execution of the program on a resource-constrained device for storing one or more frames where each frame includes a return pointer to an invoking method that called a currently executing method in the program, the apparatus comprising:

means for defining an ordering for methods included in the program, each method including protected code and an exception handler array defining exception handlers associated with the method, the ordering defining the placement of the protected code in a first portion of a package; and means for combining in block form exception handler information for the methods included in the program into a combined exception handler table, the combining comprising positioning the exception handler arrays in a second portion of the package based on the ordering for methods included in the program; and means for locating and searching the combined exception handler table when an, exception is thrown during execution of one of the methods to locate the exception handler information without requiring the storage on the runtime stack of a pointer to the exception handler information.

62. The apparatus of claim 61 where the pointer is a direct pointer to the exception handler information.

63. The apparatus of claim 61 where the program is a Java™ program.

64. The apparatus of claim 63 where the machine is a virtual machine implementing a Java™ virtual machine.

65. The apparatus of claim 64 where the program includes a package of methods, the methods in one or more classes, and where the virtual machine is implemented in a resource constrained device on which the package is installed and executing.

66. The apparatus of claim 65 where the resource constrained device is a smart card.

67. The apparatus of claim 65, further including means for registering the package in a registry service at installation, the registry service maintaining a pointer and a range, the pointer indicating a location in the resource constrained device of the combined exception handler table associated with a given package, the range defining a range of addresses in the resource constrained device at which methods associated with the package are located.

68. The apparatus of claim 67 where the means for locating includes means for locating a package associated with a currently executing method including means for comparing an address at which an exception was thrown against the range for each package registered in the registry service, the means for searching including means for searching the combined exception handler table associated with a located package.

69. An apparatus for converting class files into a converted applet for execution on a resource constrained device including:

means for receiving one or more class files, each class file including one or more methods, each method including protected code and an exception handler array defining exception handlers catchable by the method;

means for defining a data structure for storing the methods and exception handlers for the converted applet including a first and second portion;

means for defining an ordering for the methods and loading the methods according to the ordering in the second portion of the data structure; and means for combining in block form the exception handler arrays for all methods in a single exception handler table including ordering the exception handler arrays according to the ordering defined for the methods and storing the single exception handler array in the first portion of the data structure.

70. An apparatus for managing exceptions throwable during execution of two or more methods in one or more classes by a virtual machine on a resource-constrained device, each method included in a class and including protected code and an exception handler array defining exception handlers associated with the method, the protected code of the two or more methods stored in a first portion of a package according to an ordering, the individual exception handler arrays combined in block form and forming a single exception handler table for the two or more methods, the exception handler arrays positioned in a second portion of the package based on the ordering of the two or more methods, the apparatus comprising:

means for searching the exception handler table when an exception is thrown while executing one of the methods including locating a first matching exception in the single exception handler table.

\* \* \* \* \*